United States Patent
Husemann et al.

(10) Patent No.: US 6,512,022 B2
(45) Date of Patent: Jan. 28, 2003

(54) STRUCTURED UV-CROSSLINKED ACRYLIC PRESSURE-SENSITIVE ADHESIVE COMPOSITIONS

(75) Inventors: Marc Husemann, Hamburg (DE); Stephan Zöllner, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/772,271

(22) Filed: Jan. 29, 2001

(65) Prior Publication Data

US 2001/0033988 A1 Oct. 25, 2001

(30) Foreign Application Priority Data

Feb. 25, 2000 (DE) ......................... 100 08 840

(51) Int. Cl.⁷ ................. C08F 2/48; C08F 8/00
(52) U.S. Cl. ................. 522/153; 522/150; 522/182; 522/178; 522/113; 522/114; 522/121; 523/105; 523/111; 526/317.1; 526/314; 526/319; 526/320; 526/321.1; 526/323.1; 526/931
(58) Field of Search ............. 522/182, 153, 522/150, 178, 113, 114, 121; 430/270.1, 281.1, 286.1; 523/111, 105; 526/314, 317.1, 319, 320, 321, 323.1, 931

(56) References Cited

U.S. PATENT DOCUMENTS

| | | | |
|---|---|---|---|
| 4,077,926 A | * | 3/1978 | Sanderson et al. ..... 260/29.6 TA |
| 4,491,628 A | | 1/1985 | Ito et al. |
| 4,810,613 A | | 3/1989 | Osuch et al. |
| 4,883,740 A | | 11/1989 | Schwalm et al. |
| 4,900,624 A | | 2/1990 | Chen .................. 428/457 |
| 4,968,581 A | | 11/1990 | Wu et al. |
| 5,045,431 A | * | 9/1991 | Allen et al. .......... 430/270.1 |
| 5,047,443 A | | 9/1991 | Rehmer |
| 5,071,730 A | * | 12/1991 | Allen et al. .......... 430/270 |
| 5,073,611 A | | 12/1991 | Rehmer et al. |
| 5,194,455 A | | 3/1993 | Massow et al. |
| 5,230,984 A | * | 7/1993 | Tachiki et al. ......... 430/270 |
| 5,786,131 A | * | 7/1998 | Allen et al. .......... 430/325 |
| 5,861,231 A | | 1/1999 | Barclay et al. |
| 5,910,392 A | | 6/1999 | Noaki et al. |

FOREIGN PATENT DOCUMENTS

| | | |
|---|---|---|
| DE | 27 43 979 B 2 | 4/1979 |
| EP | 0 343 467 B1 | 11/1989 |
| EP | 0 594 109 A1 | 4/1994 |
| EP | 0 660 187 A1 | 6/1995 |
| WO | WO 92/15394 | 9/1992 |
| WO | WO 92/15651 | 9/1992 |
| WO | WO 96/35725 | 11/1996 |
| WO | WO 00/04079 | 1/2000 |

\* cited by examiner

*Primary Examiner*—James J. Seidleck
*Assistant Examiner*—Sanza L. McClendon
(74) *Attorney, Agent, or Firm*—Norris McLauglin & Marcus

(57) ABSTRACT

Structured polyacrylates obtainable by crosslinking, induced by UV irradiation, of a polymer mixture comprising the following components:

a) polyacrylate copolymers of the following monomers a1) acrylic acid and/or acrylic esters of the following formula $$CH_2=CH(R^1)(COOR^2),$$

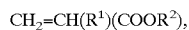

where $R^1$=H or $CH_3$ and $R^2$ is an alkyl chain having 1–20 carbon atoms, at 70–99% by weight, based on component (a), a2) olefinically unsaturated monomers containing functional groups, at 0–15% by weight, based on component (a), a3) tert-butyl acrylate, at 1–15% by weight, based on component (a), and b) a photocationic initiator at 0.01–25% by weight, based on the overall polymer mixture, the structuring of the polyacrylates comprising the presence in the polyacrylates of regions of high crosslinking alongside regions of low crosslinking and/or noncrosslinked regions.

28 Claims, 2 Drawing Sheets

STRUCTURED UV-CROSSLINKED ACRYLIC PRESSURE-SENSITIVE ADHESIVE COMPOSITIONS

DESCRIPTION

The invention relates to structured polyacrylates crosslinked by selective UV irradiation, to their use, and to a process for preparing them.

In the field of pressure-sensitive adhesive (PSA) compositions, ongoing technological developments in the coating technique mean that there is a progressive need for new developments. Within the industry, hotmelt processes with solventless coating technology are of increasing importance in the preparation of PSA compositions, since the environmental regulations are becoming ever greater and the prices of solvents continue to rise. The consequence of this is that solvents are to be eliminated as far as possible from the manufacturing process for PSA tapes. The associated introduction of the hotmelt technology is imposing ever greater requirements on the adhesive compositions. Acrylic PSA compositions in particular are the subject of very intensive investigations aimed at improvements. For high-level industrial applications, polyacrylates are preferred on account of their transparency and weathering stability. In addition to these advantages, however, these acrylic PSA compositions must also meet stringent requirements in respect of shear strength and bond strength. This profile of requirements is met by polyacrylates of high molecular weight and high polarity with subsequent efficient crosslinking. These high shear strength, polar PSA compositions possess the disadvantage, however, that they are unsuited to the hotmelt extrusion process, because high application temperatures are necessary and because, furthermore, the molecular weight of the polymer is reduced by shearing in the extruder. This damage significantly lowers the level of the adhesive properties. The bond strength and the tack are generally low, since owing to the polar fractions in the adhesive compositions the glass transition temperature is relatively high. The shear strengths of the hotmelt-coated acrylic PSA compositions, in particular, fall distinctly in comparison to the original, solvent-coated PSA composition. At the present time, therefore, different concepts aimed at reducing the flow viscosity and thereby facilitating extrusion coating of these PSA compositions are being investigated.

The industry is pursuing a variety of concepts for achieving this objective. One possibility is the highly efficient crosslinking of a low-viscosity, nonpolar acrylic adhesive composition only when it is on the backing. Acrylates containing electron donating groups are copolymerized and, during crosslinking by UV or EBC (EBC: electron beam curing), they stabilize free radicals that are formed. Examples are tertiary amine monomers [WO96/35725], tertiary butylacrylamide monomer [U.S. Pat. No. 5,194,455], and the tetrahydrofurfuryl acrylates cited and used in EP 0 343 467 B1. A further efficient crosslinking concept is the copolymerization of UV photoinitiators into the polyacrylate chain. For example, benzoin acrylate has been used as a comonomer and the crosslinking has been conducted on the backing using UV light [DE 27 43 979 A1]. In U.S. Pat. No. 5,073,611, on the other hand, benzophenone and acetophenone were used as copolymerizable monomers.

An entirely new method has come from chip manufacture. By adding a photocationic initiator and carrying out irradiation with UV light, polymers containing ester functions are deprotected and free carboxylic acids or hydroxyl functions are generated. This method has been described in U.S. Pat. No. 4,491,628. More recent developments deal with the change in the UV light wavelength to 193 nm [U.S. Pat. No. 5,910,392] and with improving the resolution [U.S. Pat. Nos. 5,861,231; 4,968,581; 4,883,740; 4,810,613; 4,491,628].

It is an object of the invention to provide a polyacrylate whose intermediates in the course of processing feature a low viscosity and thus great ease of processing in the hotmelt process, and which is converted only after processing, e.g., in a hotmelt process, into a composition of high shear strength. Through an appropriate choice of the reaction parameters during the conversion reaction, the intention is that it should be possible to adjust the physical properties of the polymer. The reaction causing the conversion should be able to be conducted when the polymer composition is already present in its ultimate form: for example, applied as an adhesive composition on a backing.

By the introduction of surface structures into the acrylic PSA compositions (introduction of polar alongside nonpolar regions) during UV irradiation, the intention is to obtain an additional improvement in the adhesive properties of the acrylic PSA compositions, a particular intention being to improve the bond strength and the tack in respect of the uniform polyacrylate mixtures. The aim of the invention is therefore to produce hard segments by the UV-initiated deprotection reaction of tert-butyl acrylate to give the free carboxylic acid by means of selective UV irradiation through a mask.

This object is achieved by means of a polyacrylate in accordance with the main claim. The subclaims relate to advantageous developments of the invention and to a process for preparing the polyacrylate, and also to its use.

The invention accordingly provides structured polyacrylates preparable by crosslinking, induced by UV irradiation, of a polymer mixture comprising the following components:

a) polyacrylate copolymers of the following monomers a1) acrylic acid and/or acrylic esters of the following formula

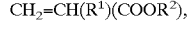

where $R^1$=H or $CH_3$ and $R^2$ is an alkyl chain having 1–20 carbon atoms, at 70–99% by weight, based on component (a), a2) olefinically unsaturated monomers containing functional groups, at 0–15% by weight, based on component (a), a3) tert-butyl acrylate, at 1–15% by weight, based on component (a), and b) a photocationic initiator at 0.01–25% by weight, based on the overall polymer mixture, the structuring of the polyacrylates comprising the presence in the polyacrylates of regions of high crosslinking alongside regions of low crosslinking and/or noncrosslinked regions.

It is particularly advantageous if component (a1) is present at 85–89% by weight, based on component (a), and/or component (a2) is present at 4–6% by weight, based on component (a), and/or component (a3) is present at 7–9% by weight, based on component (a).

It is very advantageous to use a polymer mixture in which up to 3% by weight, based on the overall polymer mixture, of c) a difunctional or polyfunctional crosslinker is added.

Crosslinkers which can be used here are all difunctional or polyfunctional compounds whose functional groups are able to enter into a linking reaction with the polyacrylates, especially addition polymerization, polycondensation or polyaddition reactions. Preferably, these reactions will take place on a carboxyl group. Particularly suitable crosslinkers are epoxides or isocyanates containing at least two functional groups, although all other compounds which react with carboxyl groups are also suitable. It is also possible to use metal chelate compounds for this purpose.

A process for preparing structured polyacrylates by structured crosslinking of polyacrylate mixtures comprises irradiating the base polymer mixture with ultraviolet light in such a way that only certain regions of the polymer mixture are exposed to the UV radiation.

The preparation process may in particular be conducted such that the base polymer mixture is irradiated with ultraviolet light through a perforated mask in such a way that only certain regions of the polymer mixture are exposed to the UV radiation.

Alternatively, the structuring of the polymer mixture for curing may be achieved by using, rather than the perforated mask, a film whose two-dimensional extent has regions of different UV light permeability, so that certain regions of the polymer mixture are exposed to different intensities of the UV radiation.

The invention further provides for the use of the polyacrylate as a pressure-sensitive adhesive composition, in particular its use as a pressure-sensitive adhesive composition for an adhesive tape, the acrylic pressure-sensitive adhesive composition being present as a single- or double-sided film on a backing sheet.

As backing materials for adhesive tapes, for example, it is possible in this context to use the materials customary and familiar to the skilled worker, such as sheets (polyester, PET, PE, PP, BOPP, PVC), nonwovens, wovens and woven sheets, and also release paper, if desired. This list is not intended to be conclusive.

The invention set out above makes it possible to achieve the stated object. A polymer mixture is presented which is present in low-viscosity form during processing and in which the shear strength can be increased after it has been applied, for example, to a backing, this increase in shear strength being achieved by converting nonpolar into polar groups. The flow viscosity of the starting polyacrylates is very low and is therefore highly suitable for the hotmelt process, for example. By selective conversion of the groups it is possible to generate polar segments alongside nonpolar segments, leading to an improvement in the adhesive properties of the product.

The principles of the invention are set out below. The starting polymers may be prepared by a free radical polymerization, and their molecular weight is of the order of 1 000 000. For the starting polymer mixture it is possible to use any polymer which has adhesive properties in accordance with the Handbook of Pressure-sensitive Adhesives, p. 172, §1, 1989. As an essential component for the deprotection reaction which is to take place subsequently, polymers prepared using tert-butyl acrylate as comonomer must be present, since the conversion of the nonpolar into polar groups is based on the replacement of the tert-butyl group by protons.

The chemical reaction whose consequence is the conversion of nonpolar into polar PSA compositions on the backing is a deprotection of the tert-butyl acrylate to give the free carboxylic acid, in the presence of protons, and has already been known for a long time [Loev, Chem. Ind. (London) 193 (1964)].

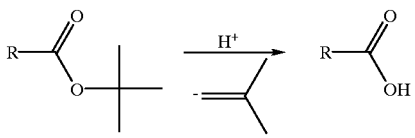

This reaction is used in the photoresistance technology (photoresists: light-sensitive, film-forming materials whose solubility behavior alters by exposure to light or other irradiation; in the case of negative working photoresists, this takes place by crosslinking or photopolymerization) for the deprotection of tert-butyl groups. In that technology, the acid is produced by the UV irradiation of an admixed photocationic initiator. In the context of this invention, this technology has been transferred to PSA compositions.

Cationic photoinitiators are typically aryldiazonium salts ("onium salts"), which may be represented in general by the formula $Ar-N=N^+LX^-$, where $LX^-$ is an adduct of a Lewis acid L and a Lewis base $X^-$. Particularly advantageous for $LX^-$ are $BF_4^-$, $SbF_5^-$, $AsF_5^-$, $PF_5^-$ and $SO_3CF_2^-$. Under the influence of UV radiation, there is rapid cleavage of the molecule into the aryl halide (ArX), nitrogen, and the corresponding Lewis acid. Diaryliodonium salts $(C_6H_5)_2I^+ LX^-$ and triarylsulfonium salts $(C_6H_5)_3S^+LX^-$ are also known for use as cationic photoinitiators; in the presence of proton donors, they form strong (Brönstedt) acids, which are likewise highly suitable for the initiation of cationic polymerizations.

Sulfonium salts as cationic photoinitiators are also present, for example, in the form of the compounds $H_5C_6-CO-CH_2-S^+LX^-$ or $H_5C_6-CO-CH_2-Pyr^+LX^-$, in which Pyr is a nitrogen-containing heteroaromatic system (e.g., pyridine, pyrimidine).

For the crosslinking reaction depicted, the photocationic initiators familiar to the skilled worker are used, preferably one of the initiators from the group set out in the above paragraph.

BRIEF DESCRIPTION OF THE DRAWINGS

The invention wil now be described in greater detail with reference to the drwaings, wherein:

By using a photomask, reaction of tert-butyl acrylate to the free carboxylic acid may be carried out in a controlled manner at the UV irradiated sites. FIG. 1 illustrates the principle of selective irradiation on the basis of a diagram.

Figure 1:
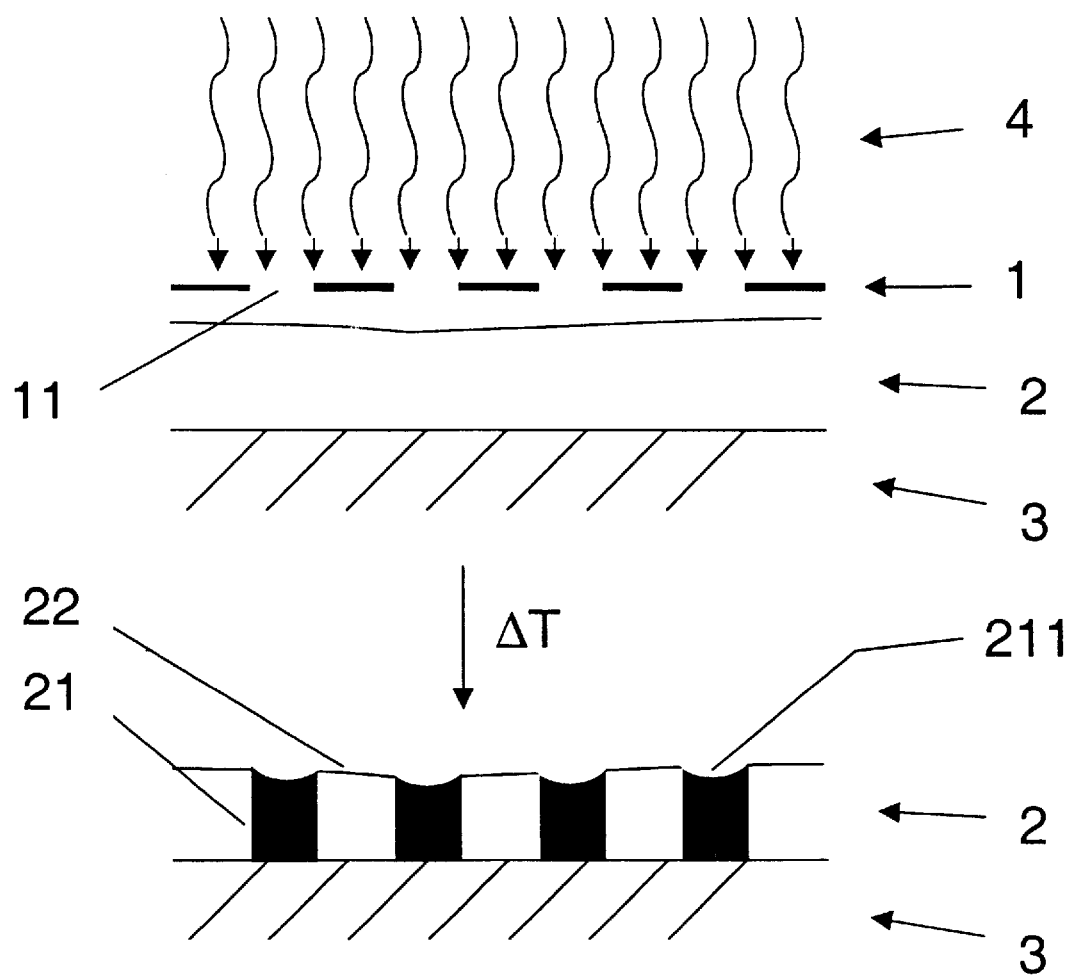
FIG. 1 is a diagram illustrating the principle of selective irradiation.

The FIGURE depicts the irradiation of the acrylic composition (2) through a perforated mask (1), the acrylic composition (2) being located on the backing (3). In accordance with the main claim, the acrylic composition (2) has been admixed with a photocationic initiator which by means of UV light (4) and at high temperatures (ΔT) initiates partial conversion of nonpolar acid derivative groups (e.g., ester groups) of the polymer (2) into polar acrylic acid groups. The ultraviolet rays (4) are able to penetrate the mask (1) only in the region of the perforations (11), so that following irradiation the situation is as depicted in the lower section of the figure. Owing to hydrogen bonds between the polar acid groups, the PSA composition (2) comprises hard segments of high crosslinking (21) alongside noncrosslinked segments (22) (nonpolar regions).

At the edges of the hard regions, the polymer chains extend into the soft regions. Accordingly, the hard regions, which are inherently of high viscosity, are linked with the soft regions and therefore hinder the mobility of these regions, thereby increasing the structural strength of the adhesive composition. Moreover, these hard segments increase the cohesion of the PSA composition. On the other hand, the soft segments result in greater ease of flow of the adhesive composition on the substrate and so increase the bond strength and the tack. The adhesive properties are greatly affected by the percentage of the irradiated surface area and by the size of the segments produced.

Depending on the proportion of tert-butyl acrylate in the polymer, UV irradiation generates a corresponding amount of polyacrylic acid, which causes the glass transition temperature $T_g$ to rise at the irradiated sites. There is a sharp increase in the $T_g$, evident from the abovementioned hardness of the corresponding segments. These hard segments increase the shear strength of the adhesive composition.

A further effect of the UV-activated deprotection reaction is the release of isobutene gas. This reaction results in a decrease in the molecular weight of the crosslinked regions (21) of the PSA composition (2), and a volume contraction (211) is observed. The film thickness of the acrylic PSA composition (2) becomes lower at the irradiated sites (21); consequently, there is a change in the surface topography of the PSA composition (2) and hence also in the adhesive properties. The contracted regions (211) have an effect comparable with that of suction cups, so that the bond strength of the acrylic PSA composition (2) is improved as a result of this "suction cup" effect.

The soft segments (22) result in greater ease of flow of the adhesive composition on the substrate and so increase the bond strength and the tack. The adhesive properties are greatly affected by the percentage of the irradiated surface area and by the size of the segments produced.

EXAMPLES

The following exemplary experiments are intended to illustrate the content of the invention, without wishing to restrict the invention unnecessarily through the choice of the examples.

Test methods

The polyacrylate compositions and their crosslinked products were characterized using the test methods described below:

Shear strength (test A1, A2, A3)

A 13 mm wide strip of the adhesive tape was applied to a smooth and cleaned steel surface. The application area was 20 mm×13 mm (length×width). The subsequent procedure was as follows:

Test A1: at room temperature, a 1 kg weight was fastened to the adhesive tape and the time which elapsed until the weight fell off was measured.

Test A2: at 70° C., a 0.5 kg weight was fastened to the adhesive tape and the time which elapsed until the weight fell off was measured.

Test A3: at 80° C., a 1 kg weight was fastened to the adhesive tape and the time which elapsed until the weight fell off was measured.

The measured shear stability times are each reported in minutes, and correspond to the average of three measurements.

Dynamic mechanical analysis, DMA (test B)

The measurements were conducted using the dynamic stress rheometer instrument from Rheometrics. The mechanical loss factor tan δ as a function of the frequency was monitored in an interval from 0.1 to 100 rad/s at 25° C. It was measured using a parallel plate arrangement.

IR spectroscopy (test C)

The measurements were carried out on a Bruker IFS 45. The fraction of acrylic acid produced was quantified by means of a calibration plot.

Rolling-ball (test D)

A 25 mm wide adhesive strip is placed on a measurement rail with the side bearing the adhesive composition under test in contact with the rail. By releasing the locking device, a V2A steel measuring ball with a diameter of 11 mm rolls down the ramp and along a horizontal area coated with the adhesive composition. The distance run on the adhesive film, in mm, serves as a measure of the tack.

180° bond strength test (test E)

A 20 mm wide strip of an acrylic PSA composition applied as a film to polyester was applied to steel plates cleaned twice with acetone and once with isopropanol. The PSA strip was pressed onto the substrate twice using a 2 kg weight. The adhesive tape was then peeled immediately from the substrate at 300 mm/min and at an angle of 180°, with the force required for this purpose being measured. All measurements were made at room temperature.

The results are reported in N/cm and are averaged from three measurements.

Masks

The following screen masks were used:

| Mask | Open area | Mesh size [μm] |
| --- | --- | --- |
| A | 33% | 60 |
| B | 50% | 60 |
| C | 60% | 60 |

Samples investigated

The samples used for the experiments were prepared as follows:

The polymers were prepared conventionally by a free radical polymerization; the average molecular weight was approximately 1 000 000. As the second component, a UV cationic initiator was admixed. For photochemically initiated polymerizations, photoinitiators known to the skilled worker were used.

EXAMPLE 1

A 2 l glass reactor conventional for radical polymerizations was charged with 36 g of tert-butyl acrylate, 40 g of methyl acrylate, 324 g of 2-ethylhexyl acrylate and 266 g of acetone/isopropanol (97:3). After nitrogen gas had been passed through the reaction solution with stirring for 45 minutes, the reactor was heated to 58° C. and 0.4 g of AIBN (2,2'-azobis(2-methylbutyronitrile)] was added. Subsequently, the external heating bath was heated to 75° C. and the reaction was conducted constantly at this external temperature. Dilution was carried out after 4 and 6 h with acetone/isopropanol mixture (150 g in each case). Following a reaction time of 36 h, the polymerization was terminated and the reaction vessel was cooled to room temperature. The polymer was subsequently applied at 50 g/m² to PET sheet and, respectively, release paper, cured with electron beams and then subjected to adhesive testing using tests A, B and D.

EXAMPLE 1c

The procedure of example 3c was used. 400 g of the adhesive composition 1 (50% strength solution) were mixed and homogenized with 17.8 g of triarylsulfonium hexafluorophosphate (Cyracure UVI-69900® [UNION CARBIDE]; 50% strength solution).

EXAMPLE 2

The procedure of example 1 was used. For the polymerization, 20 g of tert-butylacrylate, 80 g of methyl acrylate and 300 g of 2-ethylhexyl acrylate were used. The solvent amounts were retained.

EXAMPLE 2c

The procedure of example 3c was used. 400 g of the adhesive composition 2 (50% strength solution) were mixed and homogenized with 9.90 g of triarylsulfonium hexafluorophosphate (Cyracure UVI-69900® [UNION CARBIDE]; 50% strength solution).

EXAMPLE 3

The procedure of example 1 was used. For the polymerization, 40 g of tert-butylacrylate and 360 g of n-butyl acrylate were used. The solvent amounts were retained.

EXAMPLE 3a 400 g of the adhesive composition 3 (50% strength solution) were mixed with 6.60 g (5 mol percent) of triarylsulfonium hexafluorophosphate (Cyracure UVI-69900® [UNION CARBIDE]; 50% strength solution). Following homogenization, the adhesive compositions were coated onto release paper, irradiated with UV light for 30 seconds and heated at 120° C. for 10 minutes. UV irradiation was carried out using the xenon chloride lamp (VIB 308 bulb [FUSION]). The fraction of polyacrylic acid was determined using test C.

EXAMPLE 3b

The procedure of example 3a was used. 400 g of the adhesive composition 3 (50% strength solution) were mixed with 12.2 g (10 mol percent) of triarylsulfonium hexafluorophosphate (Cyracure UVI-69900® [UNION CARBIDE]; 50% strength solution).

EXAMPLE 3c

The procedure of example 3a was used. 400 g of the adhesive composition 3 (50% strength solution) were mixed with 19.8 g (15 mol percent) of triarylsulfonium hexafluorophosphate (Cyracure UVI-69900® [UNION CARBIDE]; 50% strength solution).

EXAMPLE 3d

The procedure of example 3a was used. 400 g of the adhesive composition 3 (50% strength solution) were mixed with 24.4 g (20 mol percent) of triarylsulfonium hexafluorophosphate (Cyracure UVI-6990® [UNION CARBIDE); 50% strength solution).

EXAMPLE 3e

The procedure of example 3c was used. The UV exposure time was 6 seconds.

EXAMPLE 3f

The procedure of example 3c was used. The UV exposure time was 18 seconds.

EXAMPLE 3g

The procedure of example 3c was used. The UV exposure time was 45 seconds.

EXAMPLE 3h

The procedure of example 3c was used. The UV exposure time was 60 seconds.

EXAMPLE 3i

The procedure of example 3c was used. The UV exposure time was 90 seconds.

EXAMPLE 3j

The procedure of example 3c was used. The polyacrylate was heated for 30 minutes.

EXAMPLE 3k

The procedure of example 3c was used. The polyacrylate was heated for 60 minutes.

EXAMPLE 4

The procedure was initially as in example 1. Å 2 l glass reactor conventional for radical polymerizations was charged with 36 g of tert-butyl acrylate, 40 g of methyl acrylate, 324 g of 2-ethylhexyl acrylate and 266 g of acetone/isopropanol (97:3). After nitrogen gas had been passed through with stirring for 45 minutes, the reactor was heated to 58° C. and 0.4 g of AIBN (2,2'-azobis(2-methylbutyronitrile)] was added. Subsequently, the external heating bath was heated to 75° C. and the reaction was conducted constantly at this external temperature. Dilution was carried out after 4 and 6 h with acetone/isopropanol mixture (150 g in each case). Following a reaction time of 36 h, the polymerization was terminated and the system was cooled to room temperature. Subsequently, the polymer was mixed with 0.5% of methyl red or methylene blue and 10.6 g (8 mol percent) of triaryisulfonium hexafluorophosphate (Cyracure UVI-6990® [UNION CARBIDE]; 50% strength solution) and the mixture was applied at 50 g/m$^2$ to PET film. The PSA composition was covered with a siliconized PET film (10 µm thick), and a mask was placed on, and irradiation was carried out using UV light of wavelength of 308 nm.

EXAMPLE 5

The procedure of example 4 was used. For the polymerization, 20 g of tert-butylacrylate, 80 g of methyl acrylate and 300 g of 2-ethylhexyl acrylate were used. The solvent amounts were retained. Only methyl red was used as color indicator.

EXAMPLE 6

A 2 l glass reactor conventional for radical polymerizations was charged with 20 g of tert-butyl acrylate, 24 g of methyl acrylate, 348 g of 2-ethylhexyl acrylate, 8 g of acrylic acid and 266 g of acetone/isopropanol (97:3). After nitrogen gas had been passed through with stirring for 45 minutes, the reactor was heated to 58° C. and 0.4 g of AIBN (2,2'-azobis(2-methylbutyronitrile)] was added. Subsequently, the external heating bath was heated to 75° C. and the reaction was conducted constantly at this external temperature. Dilution was carried out after 4 and 6 h with acetone/isopropanol mixture (150 g in each case). Following a reaction time of 36 h, the polymerization was terminated and the system was cooled to room temperature. The polymer was subsequently applied at 50 g/m² to PET sheet. The adhesive tape was cured with 30 kGy of electron beams and then tested in accordance with tests A, B and D.

EXAMPLE 6A 200 g of the adhesive composition 6 (50% strength solution) were mixed with 6.6 g (20 mol percent) of triarylsulfonium hexafluorophosphate (Cyracure UVI-69900® [UNION CARBIDE]; 50% strength solution). Following homogenization, the adhesive compositions were coated onto PET film with a customary adhesion promoter, dried at 35° C. and covered with siliconized PET film and the mask A. The adhesive composition was then irradiated through the mask with UV light of wavelength 308 nm. UV irradiation was carried out using the xenon chloride lamp (VIB 308 bulb [FUSION]), after which the system was heated at 120° C. for 10 minutes, the mask and the siliconized film were removed, and curing was carried out with 30 kGy of electron beams. Subsequently, the side irradiated from above was subjected to adhesive testing using tests A, B and D.

EXAMPLE 6B

The procedure of example 6A was used. Mask B was used for the UV irradiation.

EXAMPLE 6C

The procedure of example 6A was used. Mask C was used for the UV irradiation.

EXAMPLE 6C"

The procedure of example 6C was used. 18 kGy of electron beams were used for the curing of the PSA composition.

EXAMPLE 7

The procedure of example 6 was used. As comonomers, 40g of tert-butyl acrylate, 24 g of methyl acrylate, 328 g of 2-ethylhexyl acrylate and 8 g of acrylic acid were used.

EXAMPLE 7C

The procedure of example 6A was used. Adhesive composition 7 was used for blending and mask C for the irradiation.

EXAMPLE 7C"

The procedure of example 7C was used. 18 kGy of electron beams were used for the curing of the PSA composition.

EXAMPLE 8

The procedure of example 6 was used. As comonomers, 60g of tert-butyl acrylate, 24 g of methyl acrylate, 308 g of 2-ethylhexyl acrylate and 8 g of acrylic acid were used.

EXAMPLE 8C

The procedure of example 6A was used. Adhesive composition 8 was used for blending and mask C for the irradiation.

EXAMPLE 8C"

The procedure of example 8C was used. 18 kGy of electron beams were used for the curing of the PSA composition.

Results

A backing was coated with the acrylic PSA composition which was then irradiated with UV radiation in different doses, directly or through different masks. The deprotection reaction was conducted at 120° C. or 140° C. The degree of conversion may be controlled through the choice of temperature and the energy dose. The effect of the segmented irradiation and acid formation was indicated by color-changing pH indicators. The adhesive tests showed a marked improvement in the properties in respect of shear strength. The UV-treated adhesive composition had a much higher flow viscosity and a higher glass transition temperature $T_g$ than the untreated base composition; moreover, the segmented acrylic PSA compositions had a distinct improvement in the adhesive properties in respect of bond strength and tack.

The polymerizations conducted for the characterization are summarized in tab. 1.

TABLE 1

| Example | t-BuA [%] | 2-EHA [%] | MA [%] | n-BuA [%] |
|---|---|---|---|---|
| 1 | 9 | 81 | 10 | 0 |
| 2 | 5 | 75 | 20 | 0 |
| 3 | 10 | 0 | 0 | 90 | t-BuA = tert-butyl acrylate
2-EHA = 2-ethylhexyl acrylate
MA = methyl acrylate
n-BuA = n-butyl acrylate The molecular weight achieved in the case of examples 1–3 was approximately 1 000 000. Since these polyacrylate adhesive compositions were to serve as references, examples 1–3 were subjected to adhesive testing, especially in respect of the shear strength (see table 3). Since polyacrylate compositions are not very cohesive without crosslinking, they were crosslinked beforehand by irradiation with electron beams of different intensities. Moreover, these polymer compositions were analyzed by dynamic mechanical analysis in order to allow a comparison of the flow viscosities.

To convert the nonpolar compositions to more polar compositions, examples 1–3 were mixed with UV cationic initiators. To test the concept, example 3 was combined with different amounts by weight of triaryisulfonium hexafluorophosphate (Cyracure UVI-69900® [UNION CARBIDE]), coated onto a PET film support and exposed to various doses of UV radiation.

The UV source used was a xenon chloride lamp (VIB 308 bulb [FUSION]).

TABLE 2

| Example 3 | UV photo-initiator [Mol %] | Exposure period [sec] | Drying period [min] at 120° C. | Conversion [%] (Detection: IR) |
|---|---|---|---|---|
| 3a | 5 | 30 | 10 | 76 |
| 3b | 10 | 30 | 10 | 93 |
| 3c | 15 | 30 | 10 | 98 |
| 3d | 20 | 30 | 10 | 98 |
| 3e | 15 | 6 | 10 | 32 |
| 3f | 15 | 18 | 10 | 46 |
| 3g | 15 | 45 | 10 | 98 |
| 3h | 15 | 60 | 10 | 98 |
| 3i | 15 | 90 | 10 | 98 |
| 3j | 15 | 30 | 30 | 98 |
| 3k | 15 | 30 | 60 | 98 |

Parameters varied with the amount of photoinitiator, the exposure time and the drying time. The degree of conversion was determined by means of IR spectroscopy (test C).

This investigation found the optimum reaction conditions for tert-butyl acrylate deprotection in acrylic PSA compositions. Using 15 mol % of triarylsulfonium hexafluorophosphate photoinitiator (Cyracure UVI-69900® [UNION CARBIDE]) with an exposure time of 30 seconds and heating at 120° C. for 10 minutes, a conversion of 98% was achieved, based on the amount of tertiary butyl acrylate in the base polymer. The degrees of conversion were determined by IR spectroscopy. These results were confirmed by NMR spectroscopy measurements.

After the reaction parameters had been found, the adhesive compositions 1–3 were blended with 15 mol % of triarylsulfonium hexafluorophosphate photoinitiator (Cyracure UVI-69900® [UNION CARBIDE]), coated onto a release paper backing, exposed for 30 seconds and heated at 120° C. for 10 minutes. The polymer compositions were subsequently crosslinked with electron beams with a dose of 100 kGy in order to increase the cohesion of the adhesive compositions. As a reference, the base compositions 1–3 were likewise applied to the same release paper and crosslinked with electron beams with a dose of 100 kGy. In order to examine the effect of the UV treatment, the PSA compositions were subjected to adhesive testing. The results are shown in table 3:

TABLE 3

| Example | SST 10 N, RT [min] (Test A1) | SST 5 N, 70° C. [min] (Test A2) |
| --- | --- | --- |
| 1 | 90 | 15 |
| 2 | 64 | 23 |
| 3 | 88 | 26 |
| 1c | 10000 | 745 |
| 2c | 8732 | 537 |
| 3c | 10000 | 1102 |

SST: shear stability times

The conversion of the nonpolar compositions 1–3 into the UV-treated and thus markedly more polar acrylic compositions 1c–3c had a marked effect on the adhesive properties. As a result of the increase in the polyacrylic acid fraction from 0 to 5–10%, there was a distinct increase in the cohesion of the acrylic PSA compositions. The shear strength of the UV-treated adhesive tapes under a loading weight of 1 kg rose from less than 100 minutes to 8732 (2 c) or 10 000 minutes (1 c, 3 c). This can be explained by the formation of hydrogen bonds of the carboxylic acid groups. Moreover, the conversion to the more polar acrylic PSA composition is accompanied by an increase in the glass transition temperature ($T_g$). This effect likewise influenced both shear tests. Following UV treatment, there was also a marked increase in the shear stability times under hot conditions. The values obtained are situated at the level of a PSA composition of very good shear strength and cohesion. Another positive effect of this process is the ease of in situ crosslinking. Following UV treatment, a gel value (weight fraction of the polymer that is insoluble in toluene) of 12% is measured for the deprotected adhesive composition. The carboxylic acid groups generated therefore react with one another on the backing under UV light and on heating, and so lead to a precrosslinking. For the subsequent electron beam crosslinking, the electron beam dose required is generally relatively low, which in turn avoids damage to the backing.

Figure 2:
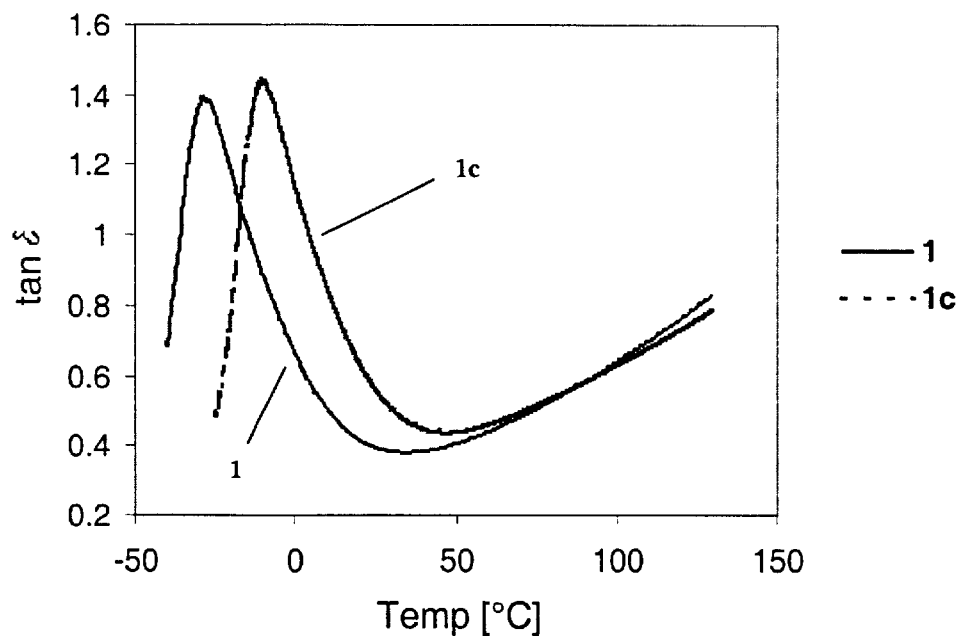
FIG. 2 is a graph depicting tan as a function of temperature.

In order to demonstrate the hotmelt suitability of this process, DMA measurements were conducted on the starting polymer and on the end product prior to electron beam curing. Dynamic mechanical analysis affords the opportunity to determine changes in the glass transition temperature and in the flow viscosity. Compositions 1 and 1c were analyzed by DMA and compared with one another (test B). The results of the measurement are shown in FIG. 2.

Adhesive compositions 1 and 1c are uncrosslinked and differ in their dynamic $T_g$. The glass transition temperature of 1 is −28° C., while after UV treatment and heating (1c) the $T_g$ rises to −5° C. This is again evidence of the influence of the polyacrylic acid formed by UV radiation.

Taking into account a molecular weight of 1 000 000 and the use of relatively nonpolar comonomers, the extrudability of the starting polymer is found to be very good. As a result of the lower glass transition temperature, this composition can be processed in a concentrative extruder at relatively low temperatures and with a high throughput. As a result of the lower temperatures, there is virtually no damage to the polyacrylate, and the average molecular weight is retained. Moreover, the gelling which occurs at high temperatures is prevented. On the other hand, the polar adhesive composition generated on the backing, with a glass transition temperature of −5° C., is significantly more difficult to concentrate. The carboxylic acid groups formed in the adhesive composition form hydrogen bonds which cause the flow viscosity of this system to rise. This assumption was confirmed by DMA measurements. In the frequency sweep shown in FIG. 3, the flow viscosity of the adhesive compositions was determined at a constant temperature.

Figure 3:
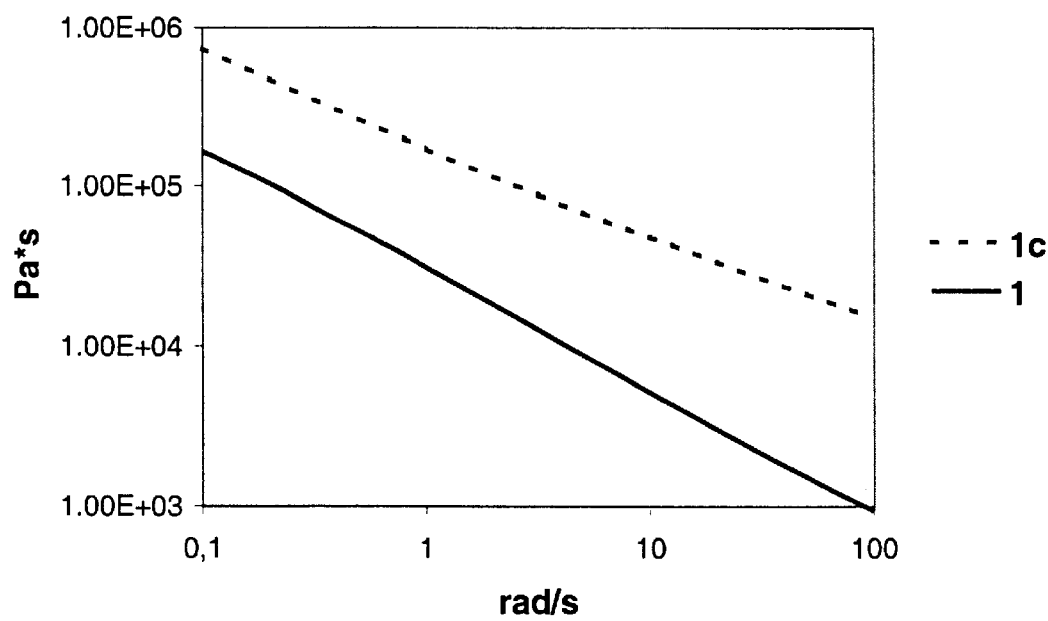
FIG. 3 is a graph depicting flow viscosity as a function of irradiation levels.

Following UV irradiation, there is a marked increase in the flow viscosity of 1 (see FIG. 3). This corresponds in turn to the glass transition temperatures measured above. The increase in internal strength as a result of the formation of hydrogen bonds causes a significant rise in the flow viscosity. The adhesive composition generated on the backing would be able to be concentrated in the extruder only at very high temperatures.

Overall, this UV process is particularly suitable for the hotmelt technology for the preparation of high-viscosity acrylic PSA compositions of high shear strength from low-viscosity base acrylic compositions which are easy to process in a concentrative extruder.

Selective UV irradiation through a mask was carried out in the following experiments. The applicability of this principle was to be demonstrated by a color indicator. The following acrylic PSA compositions were prepared by free-radical polymerizations (tab. 4):

TABLE 4

| Example | t-BuA [%] | 2-EHA [%] | MA [%] | n-BuA [%] |
| --- | --- | --- | --- | --- |
| 4 | 9 | 81 | 10 | 0 |
| 5 | 5 | 75 | 20 | 0 | t-BuA = tert-butyl acrylate
2-EHA = 2-ethylhexyl acrylate
MA = methyl acrylate
n-BuA = n-butyl acrylate The polymerizations were conducted in analogy to samples 1 and 2, conventionally, in a 2 l glass reactor, using acetone as solvent, using AIBN [2,2'-azobis(2-methylbutyronitrile)] as initiator and using isopropanol as regulator. The molecular weight achieved in the case of examples 4 and 5 was approximately 1 000 000.

Subsequently, examples 4 and 5 were mixed with 8 mol% of triarylsulfonium hexafluoro-phosphate (Cyracure UVI-69900® [UNION CARBIDE]) and with 0.5% of different color indicators (methyl red, methylene blue), coated onto a PET film backing and irradiated with UV light through different masks. The UV source used was a xenon chloride lamp (VIB 308 bulb [FUSION]). It was found that, as a result of the selective irradiation, the acid is produced at targeted sites and the color indicator changes color as a result of the change in pH.

To confirm feasibility, the following adhesive compositions were prepared on the laboratory scale (tab. 5):

TABLE 5

| Example | t-BuA [%] | 2-EHA [%] | MA [%] | AA [%] |
|---------|-----------|-----------|--------|--------|
| 6 | 5 | 87 | 6 | 2 |
| 7 | 10 | 82 | 6 | 2 |
| 8 | 15 | 77 | 6 | 2 | t-BuA = tert-butyl acrylate
2-EHA = 2-ethylhexyl acrylate
MA = methyl acrylate
AA = acrylic acid The polymerizations were conducted conventionally in a 2 l glass reactor, using acetone as solvent, using AIBN [2,2'-azobis(2-methylbutyronitrile)] as initiator and using isopropanol as regulator. The molecular weight achieved in the case of examples 6–8 was approximately 1 000 000. Following the polymerization, these adhesive compositions were blended with 20 mol % of triarylsulfonium hexafluorophosphate (Cyracure UVI-6990® [UNION CARBIDE]) and applied to a polyester backing. The PSA composition was covered from the top with a thin, transparent and siliconized polyester film, and one of the above-described masks A, B or C, with different open area and different structuring, was placed on.

Irradiation was carried out in a number of cycles with UV light (308 nm wavelength). Following heating (120° C.) to activate the deprotection reaction, the samples were cured by electron beam and the side irradiated by UV from the top was subjected to adhesive testing. For comparison, the unirradiated references 6–8 were likewise evaluated. The results are set out in table 6:

TABLE 6

| Example[a] | SST10 N, RT [min] (Test A3) | Rolling ball [mm] (Test D) | BS-steel [N/cm] (Test E) |
|---------|-----------------------------|----------------------------|---------------------------|
| 6 | 2150 | 140 | 4.8 |
| 7 | 3220 | 170 | 4.6 |
| 8 | 5100 | 220 | 4.1 |
| 6A | >10000 | 150 | 4.6 |
| 6B | >10000 | 155 | 4.6 |
| 6C | >10000 | 170 | 4.4 |
| 7C | >10000 | 180 | 4.4 |
| 8C | >10000 | 240 | 4.0 |

[a]All samples were crosslinked with 30 kGy of electron beams.
SST: shear stability times
BS: bond strength Under measurement conditions of room temperature and one kilogram shear weight, values within a range between 2 150 and 5 100 minutes were obtained for the shear stability times of the reference compositions 6–8. Adhesive composition 8 possesses the highest glass transition temperature and is accordingly the most cohesive. If these samples are irradiated selectively, hard segments containing polyacrylic acid are produced, which raise the cohesion of the PSA composition. All UV-treated samples held out for more than 10 000 minutes in the shear test. Comparing the measured bond strengths, the differences are relatively small. Depending on glass transition temperature and the fraction of tert-butyl acrylate in the PSA composition, there is only an extremely small fall in bond strength. The high bond strengths may be explained by the surface topography. The hard segments possess a lower film thickness, so that a kind of "suction cap" effect occurs, by means of which the bond strengths remain at almost the same level in comparison to the unirradiated adhesive composition. The same applies to the tack of the structured adhesive composition. Because of the varying fraction of tert-butyl acrylate, the reference compositions 6–8 differ in hardness and so also possess different tack. In the rolling ball measurement it was found that reference composition 8, with the highest fraction of tert-butyl acrylate, possesses the lowest tack, at 220 mm. Comparing it with the irradiated samples 6C, 7C and 8C, it is found that there is virtually no change in tack despite the higher shear strength. This correlates in turn with the "suction cap effect". With examples 6A, 6B and 6C, the influence of the screen mask and thus of the structure generated in the PSA composition was investigated. The masks are ordered according to UV light open area. At 33% open area, 33% hard segments containing polyacrylic acid are generated in the PSA composition; at 60% open area, 60% hard segments. Comparing the tack of these three compositions, a corresponding trend is seen. The larger the open area, the lower the tack and the bond strength on steel. Overall, however, the effects are very low in comparison with the reference composition 6. Having shown that the selective UV irradiation increases the shear strength of adhesive compositions containing tert-butyl acrylate, without substantial impairment of the bond strength or tack, the reverse route was taken in the following examples. Following UV irradiation, the samples were deliberately undercrosslinked with electron beams (reduction in dose from 30 to 18 kGy), so that the shear strength lay at the level of the reference compositions optimally crosslinked with 30 kGy. Compositions 6C", 7C" and 8C" were irradiated through a mask with an open area of 60% (tab. 7).

TABLE 7

| Example[a] | SST 10 N, RT [min] (Test A3) | Rolling ball [mm] (Test D) | BC-steel [N/cm] (Test E) |
|---------|-----------------------------|----------------------------|---------------------------|
| 6C" | 2530 | 90 | 6.0 |
| 7C" | 3380 | 110 | 5.6 |
| 8C" | 4890 | 150 | 5.3 |

[a]all samples were crosslinked with 18 kGy EBC.
SST: shear stability times
BS: bond strength The comparison of the adhesive compositions 6C", 7C" and 8C" with references 6, 7 and 8 shows that the shear strengths have not changed very much as a result of the different curing with electron beams and UV light. However, a marked effect is evident in the bond strength and tack measurements. With no change in shear strength, there are improvements over the references in all three cases for the bond strength and for the tack.

What is claimed is:

1. A structured polyacrylate comprising one or more polyacrylate copolymers comprising at least one crosslinked region and at least one adjacent region which is ether a) crosslinked to a lesser extent than said at least one crosslinked region or b) not crosslinked, wherein the polyacrylate copolymers are copolymers of the following monomers:

a1) acrylic acid and/or acrylic esters of the formula:
    $CH_2=CH(R^1)(COOR^2)$
    wherein $R^1$=H or $CH_3$ and $R^2$ is an alkyl chain having 1 to 20 carbon atoms;
  a2) olefinically unsaturated monomers containing one or more functional group; and a3) tert-butyl acrylate;
wherein said copolymers are based on 70–99% by weight of monomer a1), 0–15% by weight of monomer a2), and 1–15% by weight of monomer a3), and all percents by weight are based on total weights of said copolymers.

2. A structured polyacrylate comprising one or more polyacrylate copolymers comprising at least one crosslinked region and at least one adjacent region which is either a) crosslinked to a lesser extent than said at least one crosslinked region or b) not crosslinked, wherein the polyacrylate copolymers are copolymers of the following monomers:
   a1) acrylic acid and/or acrylic esters of the formula:
      $CH_2=CH(R^1)(COOR^2)$
      wherein $R^1$=H or $CH_3$ and $R^2$ is an alkyl chain having 1 to 20 carbon atoms;
   a2) olefinically unsaturated monomers containing one or more functional groups; and
   a3) tert-butyl acrylate;
wherein said copolymers are based on 85–89% by weight of monomer a1), 4–6% by weight of monomer a2), and 7–9% by weight of monomer a3), and all percents by weight are based on total weights of said copolymers.

3. The structured polyacrylate according to claim 2, which is crosslinked with an added difunctional or polyfunctional crosslinker, and said crosslinker is present in the structured polyacrylate in an amount of up to 3% by weight based on a total weight of the structured polyacrylate.

4. The structured polyacrylate according to claim 3, wherein the function groups of said olefinically unsaturated monomers are acrylate functional groups.

5. A structured polyacrylate comprising one or more polyacrylate copolymers comprising at least one crosslinked region and at least one adjacent region which is either a) crosslinked to a lesser extent than said at least one crosslinked region or b) not crosslinked, wherein the polyacrylate copolymers are copolymers of the following monomers:
   acrylic acid and/or acrylic esters of the formula:
      $CH_2=CH(R^1)(COOR^2)$
      wherein $R^1$=H or $CH_3$ and $R^2$ is an alkyl chain having 1 to 20 carbon atoms;
   a2) olefinically unsaturated monomers containing one or more functional groups; and
   a3) tert-butyl acrylate;
wherein said copolymers are based on 70–99% by weight of monomer a1), 0–15% by weight of monomer a2), and 1–15% by weight of monomer a3), and all percents by weight are based on total weights of said copolymers; and wherein said copolymers, wherein crosslinked, are crosslinked with an added difunctional or polyfunctional crosslinker, and said crosslinker is present in the structured polyacrylate in an amount of up to 3% by weight based on a total weight of the structured polyacrylate.

6. The structured polyacrylate according to claim 5, wherein the functional groups of said olefinically unsaturated monomers are acrylate functional groups.

7. A pressure sensitive adhesive composition comprising the structured polyacrylate adhesive according to claim 1.

8. A pressure sensitive adhesive composition comprising the structured polyacrylate adhesive according to claim 2.

9. A pressure sensitive adhesive composition comprising the structured polyacrylate adhesive according to claim 3.

10. A pressure sensitive adhesive composition comprising the structured polyacrylate adhesive according to claim 4.

11. A pressure sensitive adhesive composition comprising the structured polyacrylate adhesive according to claim 5.

12. A pressure sensitive adhesive composition comprising the structured polyacrylate adhesive according to claim 6.

13. An adhesive tape comprising a pressure sensitive adhesive composition according to claim 7 applied to one or both sides of a backing sheet.

14. An adhesive tape comprising a pressure sensitive adhesive composition according to claim 8 applied to one or both sides of a backing sheet.

15. An adhesive tape comprising a pressure sensitive adhesive composition according to claim 9 applied to one or both sides of a backing sheet.

16. An adhesive tape comprising a pressure sensitive adhesive composition according to claim 10 applied to one or both sides of a backing sheet.

17. An adhesive tape comprising a pressure sensitive adhesive composition according to claim 11 applied to one or both sides of a backing sheet.

18. An adhesive tape comprising a pressure sensitive adhesive composition according to claim 12 applied to one or both sides of a backing sheet.

19. A method of producing an adhesive bond on a substrate, said method comprising adhering an adhesive tape according to any one of claims 13–18 to said substrate to produce said adhesive bond.

20. A process for preparing a structured polyacrylate according to claim 1, said process comprising the following steps:
   a) providing a base polymer mixture comprising said one or more polyacrylate copolymers in the presence of one or more photocationic initiators, which in the aggregate are present in an amount of 0.01–25% by weight based on the weight of said one or more polyacrylate copolymers; and
   b) irradiating the base polymer mixture with ultraviolet light in such a way that only certain regions of said base polymer mixture are exposed to the ultraviolet light.

21. A process for preparing a structured polyacrylate according to claim 1, said process comprising the following steps:
   a) providing a base polymer mixture comprising said one or more polyacrylate copolymers in the presence of one or more photocationic initiators, which in the aggregate are present in an amount of 0.01–25% by weight based on the weight of said one or more polyacrylate copolymers; and
   b) irradiating the base polymer mixture with ultraviolet light through a perforated mask in such a way that only certain regions of said base polymer mixture are exposed to the ultraviolet light.

22. A process for preparing a structured polyacrylate according to claim 1, said process comprising the following steps:
   a) providing a base polymer mixture comprising said one or more polyacrylate copolymers in the presence of one or more photocationic initiators, which in the aggregate are present in an amount of 0.01–25% by weight based on the weight of said one or more polyacrylate copolymers; and
   b) irradiating the base polymer mixture with ultraviolet light through a film whose two-dimensional extent has regions of different UV light permeability in such a way that only certain regions of said base polymer mixture are exposed to different intensities of the ultraviolet light.

23. A process for preparing a structured polyacrylate according to claim 2, said process comprising the following steps:

a) providing a base polymer mixture comprising said one or more polyacrylate copolymers in the presence of one or more photocation initiators, which in the aggregate are present in an amount of 0.01–25% by weight based on the weight of said one or more polyacrylate copolymers; and b) irradiating the base polymer mixture with ultraviolet light in such a way that only certain regions of said base polymer mixture are exposed to the ultraviolet light.

24. A process for preparing a structured polyacrylate according to claim 2, said process comprising the following steps:

a) providing a base polymer mixture comprising said one or more polyacrylate copolymers in the presence of one or more photocationic initiators, which in the aggregate are present in an amount of 0.01–25% by weight based on the weight of said one or more polyacrylate copolymers; and b) irradiating the base polymer mixture with ultraviolet light through a perforated mask in such a way that only certain regions of said base polymer mixture are exposed to the ultraviolet light.

25. A process for preparing a structured polyarylate according to claim 2, said process comprising the following steps:

a) providing a base polymer mixture comprising said one or more polyacrylate copolymers in the presence of one or more photocationic initiators, which in the aggregate are present in an amount of 0.01–25% by weight based on the weight of said one or more polyacrylate copolymers; and b) irradiating the base polymer mixture with ultraviolet light through a film whose two-dimensional extent has regions of different UV light permeability in such a way that only certain regions of said base polymer mixture are exposed to different intensities of the ultraviolet light.

26. A process for preparing a structured polyacrylate according to claim 5, said process comprising the following steps:

a) providing a base polymer mixture comprising said one or more polyacrylate copolymers in the presence of one or more photocationic initiators, which in the aggregate are present in an amount of 0.01–25% by weight based on the weight of said one or more polyacrylate copolymers; and b) irradiating the base polymer mixture with ultraviolet light in such a way that only certain regions of said base polymer mixture are exposed to the ultraviolet light.

27. A process for preparing a structured polyacrylate according to claim 5, said process comprising the following steps:

a) providing a base polymer mixture comprising said one or more polyacrylate copolymers in the presence of one or more photocationic initiators, which in the aggregate are present in an amount of 0.01–25% by weight based on the weight of said one or more polyacrylate copolymers; and b) irradiating the base polymer mixture with ultraviolet light through a perforated mask in such a way that only certain regions of said base polymer mixture are exposed to the ultraviolet light.

28. A process for preparing a structured polyacrylate according to claim 5, said process comprising the following steps:

a) providing a base polymer mixture comprising said one or more polyacrylate copolymers in the presence of one or more photocationic initiatiors, which in the aggregate are present in an amount of 0.01–25% by weight based on the weight of said one or more polyacrylate copolymers; and b) irradiating the base polymer mixture with ultraviolet light through a film whose two-dimensional extent has regions of different UV light permeability in such a way that only certain regions of said base polymer mixture are exposed to different intensities of the ultraviolet light.

* * * * *